United States Patent
Liu et al.

(10) Patent No.: US 8,891,036 B2
(45) Date of Patent: Nov. 18, 2014

(54) FIXING STRUCTURE FOR FIXING A DISPLAY PANEL AND DISPLAY DEVICE THEREWITH

(75) Inventors: Cheng-Shing Liu, New Taipei (TW); Jen-Hao Liu, New Taipei (TW); Jen-Feng Lin, New Taipei (TW); Jhih-Hong Wang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 103 days.

(21) Appl. No.: 13/455,144

(22) Filed: Apr. 25, 2012

(65) Prior Publication Data

US 2013/0070399 A1  Mar. 21, 2013

(30) Foreign Application Priority Data

Sep. 15, 2011  (TW) .............................. 100133151 A

(51) Int. Cl.
  *G02F 1/1333* (2006.01)
  *G06F 1/16* (2006.01)
(52) U.S. Cl.
  CPC ........ *G06F 1/1601* (2013.01); *G02F 1/133308* (2013.01)
  USPC ............. 349/58; 362/632; 362/633; 362/634; 361/752; 353/119; 348/373; 348/836; 348/843
(58) Field of Classification Search
  CPC .................................................. G02F 1/133308
  USPC ........................................................ 349/58
  See application file for complete search history.

(56) References Cited

U.S. PATENT DOCUMENTS

| | | | |
|---|---|---|---|
| 6,816,213 B2 * | 11/2004 | Kato et al. | 349/58 |
| 2002/0154474 A1 * | 10/2002 | Merz et al. | 361/683 |
| 2009/0237589 A1 * | 9/2009 | Shin et al. | 349/58 |
| 2010/0007816 A1 * | 1/2010 | Lee | 349/58 |
| 2010/0165219 A1 * | 7/2010 | Ikunami | 348/836 |
| 2010/0165232 A1 * | 7/2010 | Park et al. | 349/58 |
| 2010/0253874 A1 * | 10/2010 | Ito et al. | 349/58 |

FOREIGN PATENT DOCUMENTS

CN  101842826 A  9/2010

OTHER PUBLICATIONS

Office action mailed on Jun. 17, 2014 for the China application No. 201110316808.7, p. 3 line 5-11.

* cited by examiner

*Primary Examiner* — Michael Caley
*Assistant Examiner* — Edmond Lau
(74) *Attorney, Agent, or Firm* — Winston Hsu; Scott Margo

(57) ABSTRACT

A fixing structure for fixing a display panel is disclosed. The fixing structure includes a bezel and a cover. The bezel includes a frame, a first bending portion bent from a side of the frame, and a first hooking portion connected to an end of the first bending portion. The cover and the bezel cover the display panel together. The cover includes a board, a first curved portion bent from a side of the board, and a first hook component connected to an end of the first curved portion and installed inside the frame and the first bending portion. The first hook component engages with the first hooking portion and fixes a side of the display panel on the side of the first curved portion as the bezel combines with the cover.

10 Claims, 5 Drawing Sheets

US 8,891,036 B2

FIXING STRUCTURE FOR FIXING A DISPLAY PANEL AND DISPLAY DEVICE THEREWITH

BACKGROUND OF THE INVENTION

1. Field of the Invention

The present invention relates to a fixing structure for fixing a display panel, and more specifically, to a fixing structure for fixing a display panel with small space, easy assembly and assembly strength.

2. Description of the Prior Art

With the rapid development of technology, light, power-saving, and portable intelligent information products play increasingly important roles in our lives. For example, the flat display module is an important component of these products. The LCD display module has the advantages of low power consumption, small volume and no radiation pollution, thus the LCD display module has been widely utilized in notebooks, PDAs, cell phones and other portable information products. In addition, the LCD display module is gradually replacing CRT monitors and traditional TVs. In tradition, a bezel of a display device is often made of metal material or plastic material with quite weight and thickness for consideration of assembly strength, which affects light-weight and small-size development of the display device. Therefore, there is a need to provide a thinner fixing structure that can more firmly fixing the display panel to meet the light-weight and small-size requirements of consumer products.

SUMMARY OF THE INVENTION

The present invention provides a fixing structure for fixing a display panel with small space, easy assembly and assembly strength to solve the problems mentioned above.

According to the claimed invention, a fixing structure for fixing a display panel is disclosed. The fixing structure includes a bezel and a cover. The bezel includes a frame, a first bending portion bent from a side of the frame, and a first hooking portion connected to an end of the first bending portion. The cover and the bezel cover the display panel together. The cover includes a board, a first curved portion bent from a side of the board, and a first hook component connected to an end of the first curved portion and installed inside the frame and the first bending portion. The first hook component engages with the first hooking portion and fixes a side of the display panel on the side of the first curved portion as the bezel combines with the cover.

According to the claimed invention, an inclined plane is formed on an end of the first hook component for guiding the display panel to move relative to the first hook component.

According to the claimed invention, the first hook component is glued to an inner side of the frame.

According to the claimed invention, the bezel further includes a second bending portion bent from another side of the frame, and a second hooking portion connected to an end of the second bending portion. The cover further includes a second curved portion bent from another side of the board, and a second hook component connected to an end of the second curved portion and installed inside the frame and the second bending portion. The second hook component engages with the second hooking portion as the bezel combines with the cover. The cover further includes a lateral wall connected to the second hook component. An end of the lateral wall contacts against another side of the display panel, and a containing space is defined by the lateral wall, the second hook component, the second curved portion and the board for containing a signal transmission cable.

According to the claimed invention, the lateral wall is glued to an inner side of the frame.

According to the claimed invention, a display device includes a display panel and a fixing structure for fixing the display panel. The fixing structure includes a bezel and a cover. The bezel includes a frame, a first bending portion bent from a side of the frame, and a first hooking portion connected to an end of the first bending portion. The cover and the bezel cover the display panel together. The cover includes a board, a first curved portion bent from a side of the board, and a first hook component connected to an end of the first curved portion and installed inside the frame and the first bending portion. The first hook component engages with the first hooking portion and fixes a side of the display panel on the side of the first curved portion as the bezel combines with the cover.

The fixing structure for fixing the display panel of the present invention utilizes hook components on two sides to combine the bezel with the cover and to fasten the display panel. The lateral wall extending from the hook component can form the containing space to contain and receive the signal transmission cable. Therefore, the present invention provides the fixing structure for fixing the display panel with small space, easy assembly and assembly strength.

These and other objectives of the present invention will no doubt become obvious to those of ordinary skill in the art after reading the following detailed description of the embodiment that is illustrated in the various figures and drawings.

DETAILED DESCRIPTION

Figure 1:
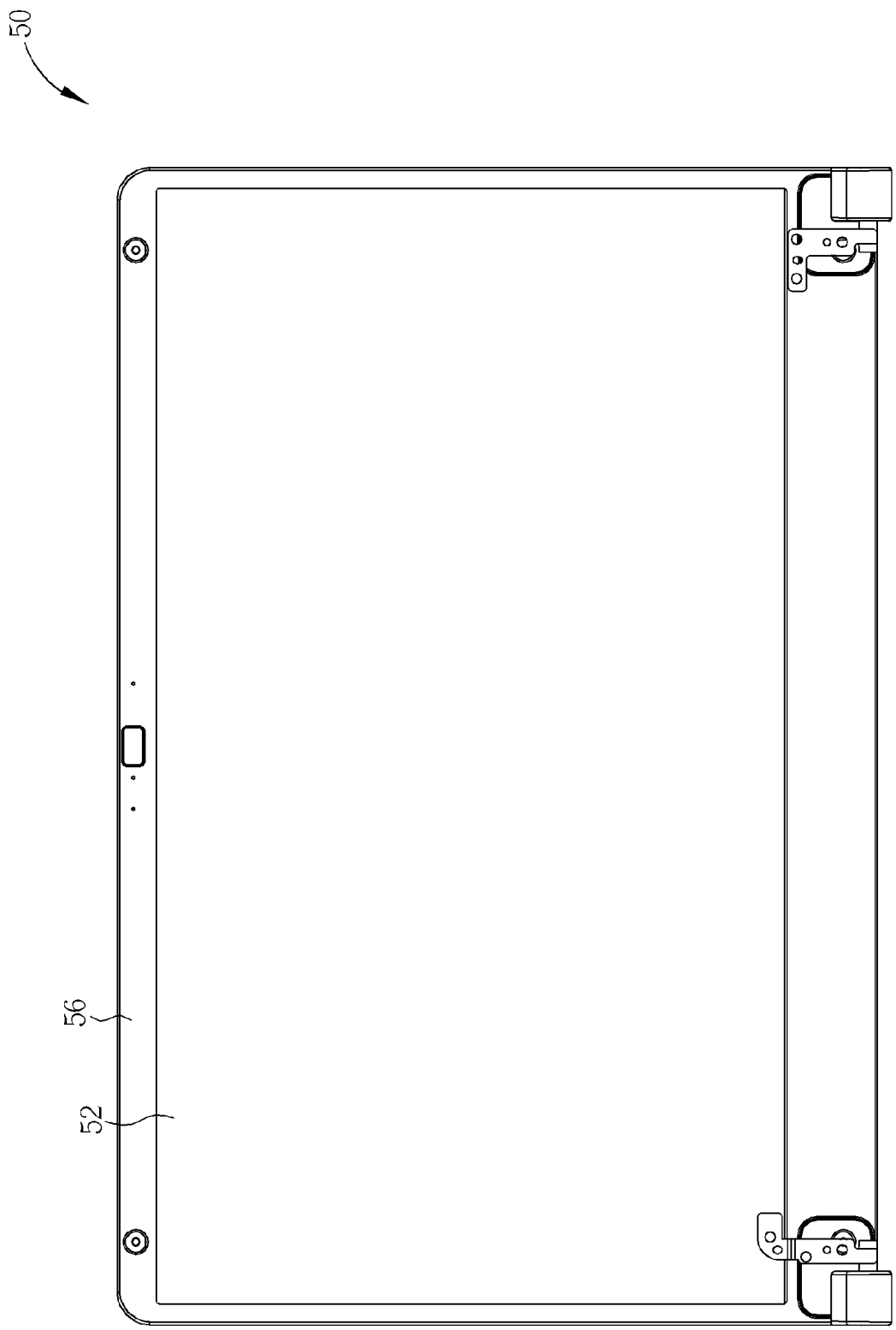
FIG. 1 is a schematic drawing of a display device according to an embodiment of the present invention.
Figure 2:
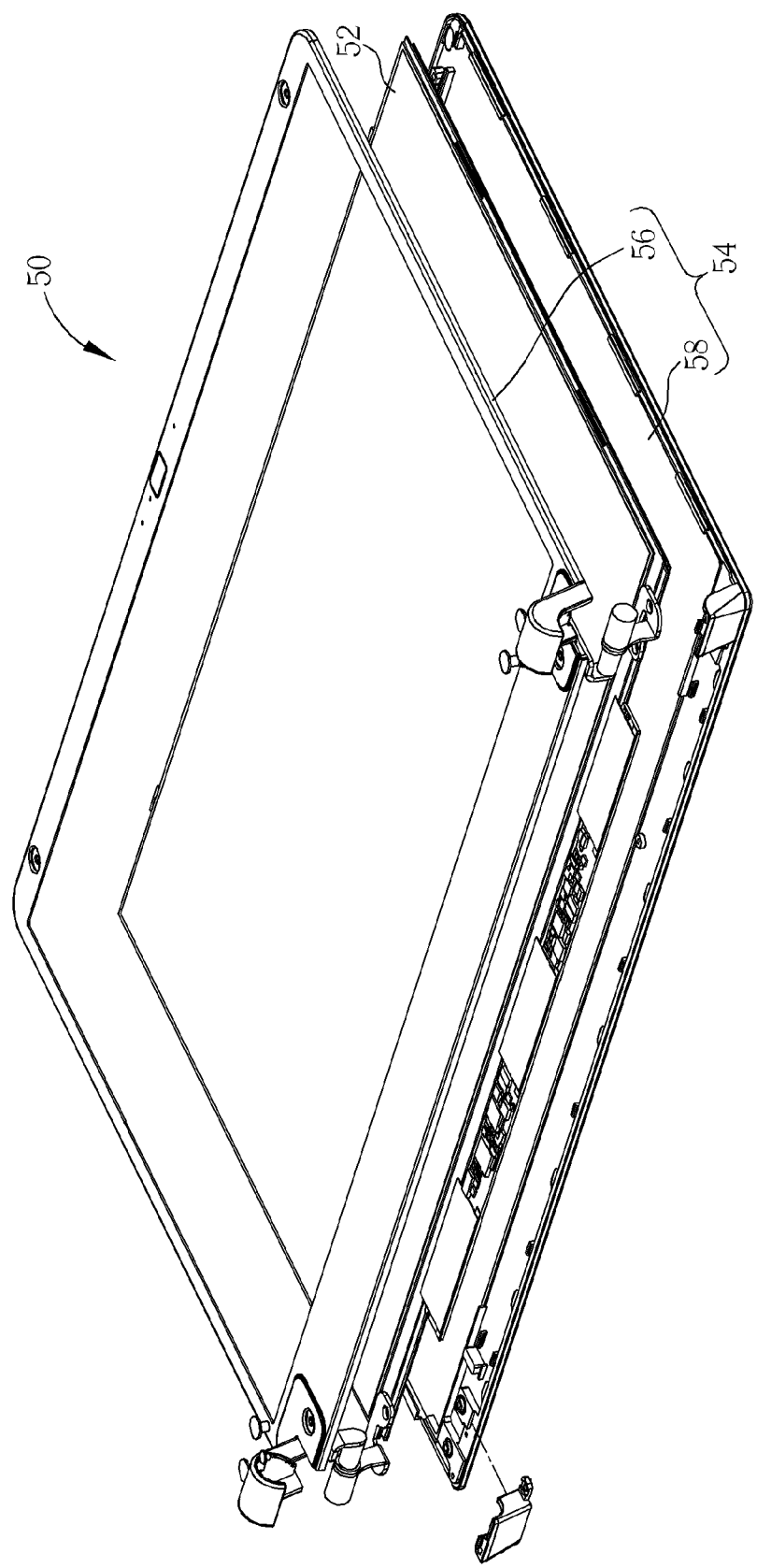
FIG. 2 is an exploded drawing of the display device according to the embodiment of the present invention.
Figure 3:
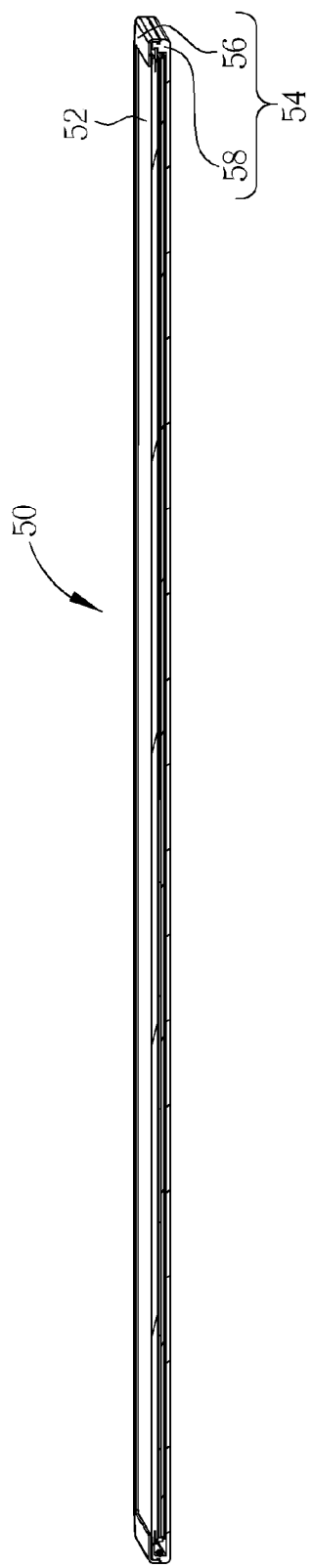
FIG. 3 is a sectional view of the display device according to the embodiment of the present invention.
Figure 4:
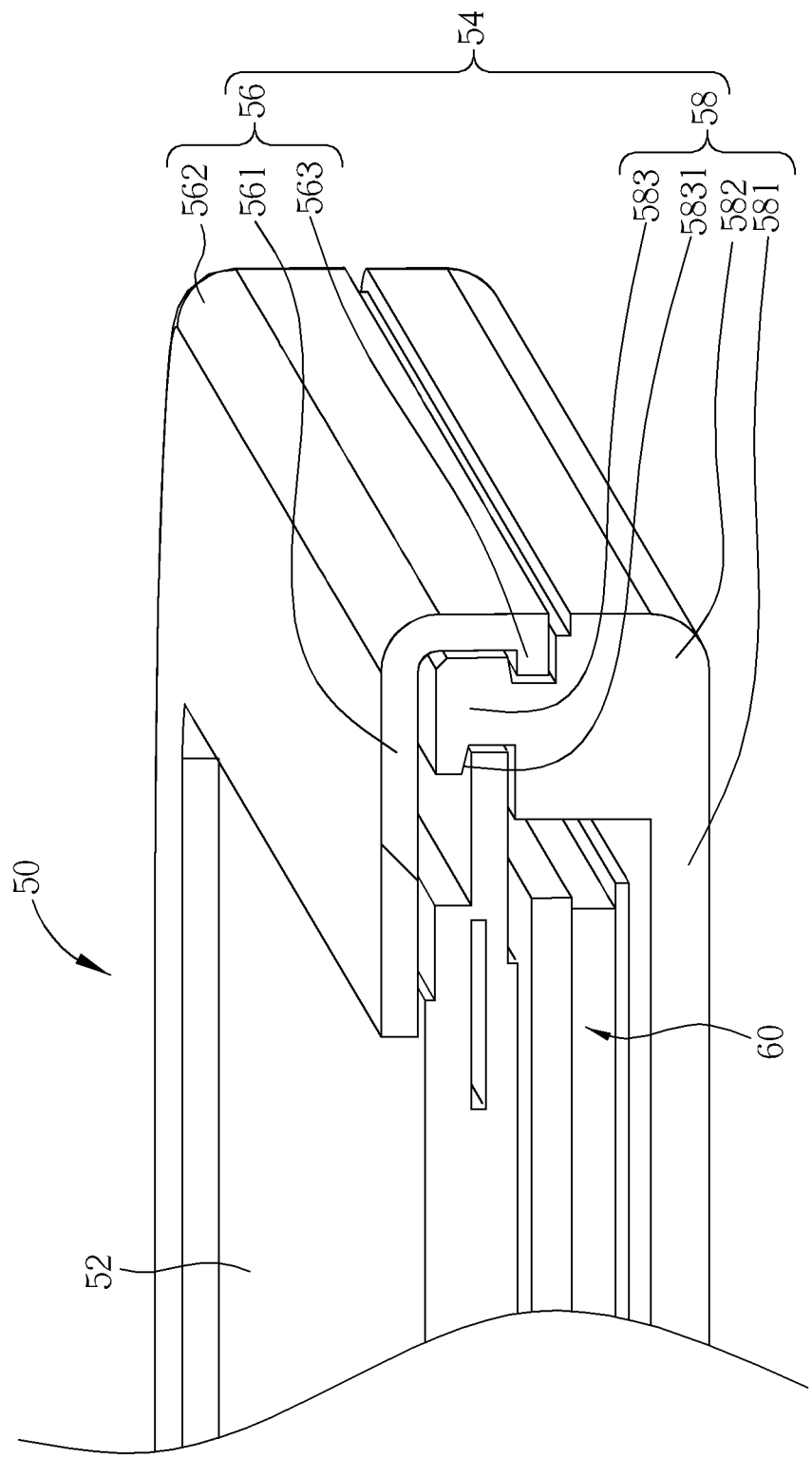
FIG. 4 and FIG. 5 are partial sectional views of the display device at two sides according to the embodiment of the present invention.
Figure 5:
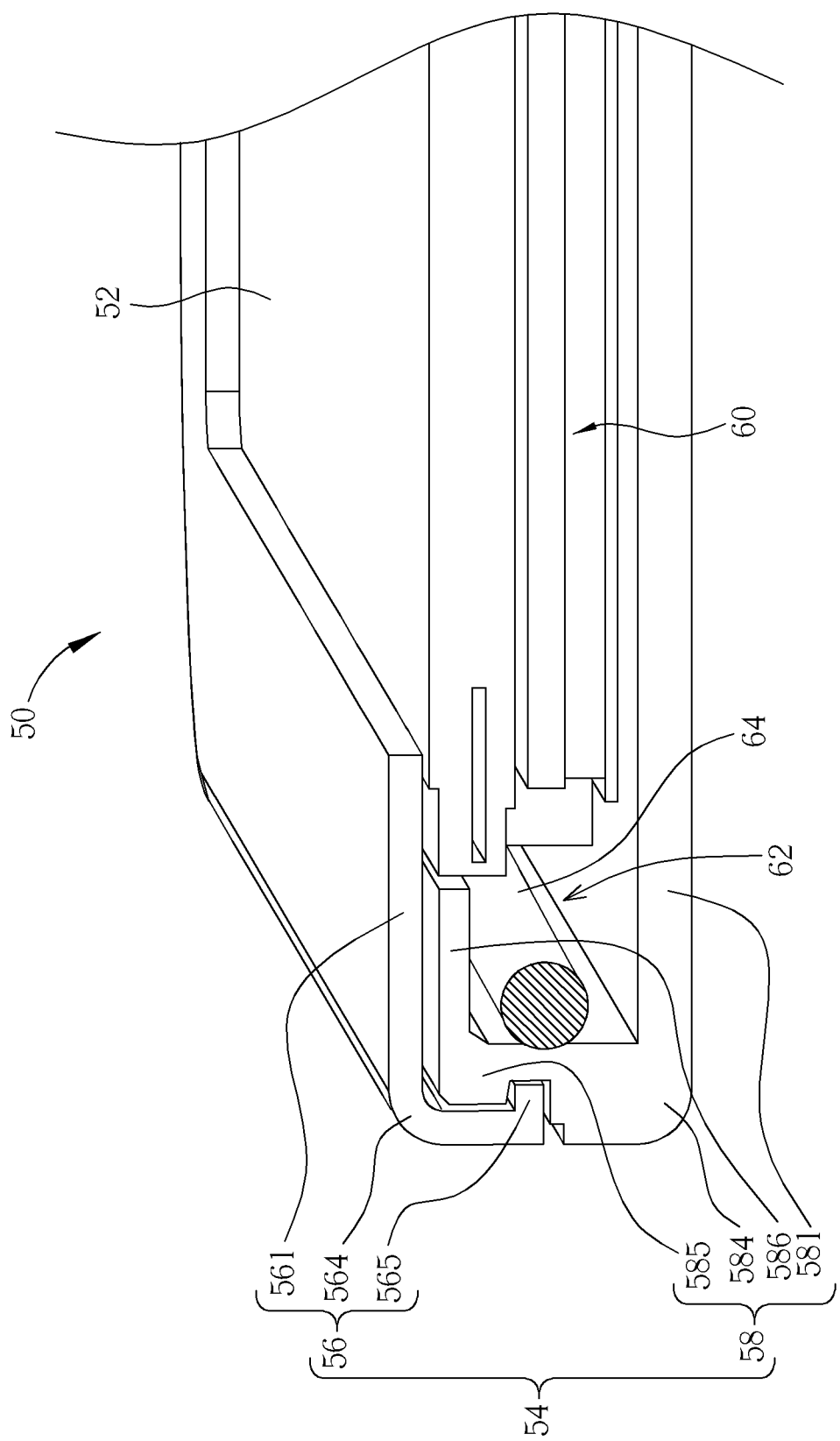

Please refer to FIG. 1 and FIG. 2. FIG. 1 is a schematic drawing of a display device 50 according to an embodiment of the present invention. FIG. 2 is an exploded drawing of the display device 50 according to the embodiment of the present invention. The display device 50 can be an LCD monitor of a notebook computer. The display device 50 includes a display panel 52, which can be a LCD panel. The display device 50 further includes a fixing structure 54 for fixing the display panel 52. The fixing structure 54 includes a bezel 56 and a cover 58 for covering the display panel 52 with the bezel 56 together. The bezel 56 and the cover 58 can be made of metal material, such as Al alloy or Mg—Al alloy. The cover 58 can be manufactured by CNC cutting process. Please refer to FIG. 3 to FIG. 5. FIG. 3 is a sectional view of the display device 50 according to the embodiment of the present invention. FIG. 4 and FIG. 5 are partial sectional views of the display device 50 at two sides according to the embodiment of the present invention. The bezel 56 includes a frame 561, a first bending portion 562, a first hooking portion 563, a second bending portion 564 and a second hooking portion 565. The cover 58 includes a board 581, a first curved portion 582, a first hook component 583, a second curved portion 584, a second hook component 585 and a lateral wall 586.

Please refer to FIG. 3 and FIG. 4. The frame 561 of the bezel 56 is disposed around the display panel 52. The first bending portion 562 is bent from a side of the frame 561. The first hooking portion 563 is connected to an end of the first bending portion 562. The board 581 of the cover 58 is installed on a back side of the display panel 52. A backlight module 60 can be installed between the board 581 and the display panel 52 for providing light for the display panel 52. The first curved portion 582 is bent from a side of the board 581. The first hook component 583 is connected to an end of the first curved portion 582 and installed inside the frame 561 of the bezel 56 and the first bending portion 562. The first hook component 583 engages with the first hooking portion 563 and fixes a side of the display panel 52 on the side of the first curved portion 582 as the bezel 56 combines with the cover 58, so as to position the display panel 52. Furthermore, an inclined plane 5831 is formed on an end of the first hook component 583 for guiding the display panel 52 to move relative to the first hook component 583 when the display panel 52 is installed on the cover 58 or disassembled from the cover 58, so as to assemble the display panel 52 conveniently. An inclined angle of the inclined plane 5831 can be substantially 75 degrees. Besides that the first hook component 583 engages with the first hooking portion 563, for enhancing assembly strength of the bezel 56 and the cover 58, an upper surface of the first hook component 583 can be glued to an inner side of the frame 561 of the bezel 56.

Please refer to FIG. 3 and FIG. 5. On another side of the bezel 56, the second bending portion 564 is bent from another side of the frame 561. The second hooking portion 565 is connected to an end of the second bending portion 564. On another side of the cover 58, the second curved portion 584 is bent from another side of the board 581. The second hook component 585 is connected to an end of the second curved portion 584 and installed inside the frame 561 of the bezel 56 and the second bending portion 564. The second hook component 585 engages with the second hooking portion 565 as the bezel 56 combines with the cover 58. The lateral wall 586 is connected to the second hook component 585, and an end of the lateral wall 586 contacts against another side of the display panel 52. The first hook component 583 fixes the side of the display panel 52 and the lateral wall 586 contacts against another side of the display panel 52 so that the display panel 52 can be fixed between the bezel 56 and the cover 58 firmly. Furthermore, a containing space 62 is defined by the lateral wall 586, the second hook component 585, the second curved portion 584 and the board 581 for containing and receiving at least one signal transmission cable 64, such as a signal transmission cable of a camera. Besides that the second hook component 585 engages with the second hooking portion 565, for enhancing assembly strength of the bezel 56 and the cover 58, an upper surface of the lateral wall 586 can be glued to an inner side of the frame 561 of the bezel 56.

In contrast to the prior art, the fixing structure for fixing the display panel of the present invention utilizes hook components on two sides to combine the bezel with the cover and to fasten the display panel. The lateral wall extending from the hook component can form the containing space to contain and receive the signal transmission cable. Therefore, the present invention provides the fixing structure for fixing the display panel with small space, easy assembly and assembly strength.

Those skilled in the art will readily observe that numerous modifications and alterations of the device and method may be made while retaining the teachings of the invention.

What is claimed is:

1. A fixing structure for fixing a display panel, comprising:
   a bezel comprising:
      a frame;
      a first bending portion bent from a side of the frame; and
      a first hooking portion connected to an end of the first bending portion; and
   a cover for covering the display panel with the bezel together, the cover comprising:
      a board;
      a first curved portion bent from a side of the board; and
      a first hook component connected to an end of the first curved portion and installed inside the frame and the first bending portion, a first recess and a second recess being formed on opposite sides of the first hook component, the first hook component hooking with the first hooking portion in the first recess and hooking a side of the display panel in the second recess and on the side of the first curved portion simultaneously as the bezel combines with the cover, and an inclined plane being formed on an end of the first hook component for guiding the display panel to move relative to the first hook component so that the side of the display panel is constrained inside the second recess.

2. The fixing structure of claim 1, wherein the first hook component is glued to an inner side of the frame.

3. The fixing structure of claim 1, wherein the first hook component is glued to an inner side of the frame.

4. The fixing structure of claim 1, wherein the bezel further comprises a second bending portion bent from another side of the frame, and a second hooking portion connected to an end of the second bending portion, and the cover further comprises:
   a second curved portion bent from another side of the board;
   a second hook component connected to an end of the second curved portion and installed inside the frame and the second bending portion, the second hook component engaging with the second hooking portion as the bezel combines with the cover; and
   a lateral wall connected to the second hook component, an end of the lateral wall contacting against another side of the display panel, and a containing space being defined by the lateral wall, the second hook component, the second curved portion and the board for containing a signal transmission cable.

5. The fixing structure of claim 4, wherein the lateral wall is glued to an inner side of the frame.

6. A display device comprising:
   a display panel; and
   a fixing structure for fixing the display panel, the fixing structure comprising:
      a bezel comprising:
         a frame;
         a first bending portion bent from a side of the frame; and
         a first hooking portion connected to an end of the first bending portion; and
      a cover for covering the display panel with the bezel together, the cover comprising:
         a board;
         a first curved portion bent from a side of the board; and
         a first hook component connected to an end of the first curved portion and installed inside the frame and the first bending portion, a first recess and a second recess being formed on opposite sides of the first hook component, the first hook component hooking with the first hooking portion in the first recess and hooking a side of the display panel in the second recess and on the side of the first curved portion simultaneously as the bezel combines with the cover, and an inclined plane being formed on an end of the first hook component for guiding the display panel to move relative to the first hook component so that the side of the display panel is constrained inside the second recess.

7. The display device of claim 6, wherein the first hook component is glued to an inner side of the frame.

8. The display device of claim 6, wherein the first hook component is glued to an inner side of the frame.

9. The display device of claim 6, wherein the bezel further comprises a second bending portion bent from another side of the frame, and a second hooking portion connected to an end of the second bending portion, and the cover further comprises:
- a second curved portion bent from another side of the board;
- a second hook component connected to an end of the second curved portion and installed inside the frame and the second bending portion, the second hook component engaging with the second hooking portion as the bezel combines with the cover; and
- a lateral wall connected to the second hook component, an end of the lateral wall contacting against another side of the display panel, and a containing space being defined by the lateral wall, the second hook component, the second curved portion and the board for containing a signal transmission cable.

10. The display device of claim 9, wherein the lateral wall is glued to an inner side of the frame.

* * * * *